Patented Nov. 21, 1939

2,180,744

UNITED STATES PATENT OFFICE 2,180,744

COMPOSITION OF MATTER

John D. Maxcy, Albany, Calif., assignor to Carbide and Carbon Chemicals Corporation, a corporation of New York No Drawing. Application April 28, 1936, Serial No. 76,740

1 Claim. (Cl. 167—39)

This invention relates to fumigants and to insecticides generally. More particularly it pertains to the combination of a highly volatile, highly toxic compound coupled with a carrier or adjuvant of lower toxicity and lower volatility.

Heretofore attempts have been made to form effective fumigants by combining a mixture of an intensely toxic substance with materials composed of substantially volatile substances having a low degree of toxicity in which the highly toxic substance is completely dissolved. All of these attempts have possessed defects from various standpoints, and, in many respects, have fallen short of the superior results obtained by the present invention. Many liquids and gases now employed as fumigants are disadvantageous from the viewpoint of practicability, or are undesirably dangerous to health; are absorbed by the essential oils of fruits and retained by other objects treated; limited to certain critical operating conditions; ineffective; corrosive; or are too costly for widespread adoption.

A principal object of this invention is the provision of an improved composition of matter useful as a fumigant which is composed of two or more agents of different degrees of toxicity which in combination exert a greater effective fumigating potency than the individual substances.

I have found that the objects of this invention can be attained, and that more effective, economical, and physiologically active fumigating compositions can be prepared, by combining a minor proportion of a highly toxic, highly volatile agent with a major proportion of a distributing or carrying agent, which is less toxic and less volatile and which at the same time is not incompatible with the fumigating function of the composition. For example, the novel features of this invention may be embodied in a fumigant composed essentially of ethylene dichloride as the carrier or adjuvant combined with ethylene oxide as the major toxic agent.

While the highly toxic ethylene oxide has been used in practice, it has been found that owing to its high volatility it is relatively ineffective except in hermetically sealed chambers. Excessive losses may occur unless the ethylene oxide enters the space to be fumigated as a liquid, rather than as a gas, and unless it remains in this state until the box or other fumigating enclosure has been filled and closed. Ethylene dichloride, on the other hand, owing to its relatively low volatility, has, among other things, only a seasonal use in open air fumigation.

The term "fumigant" is employed is a generic sense to include substances employed to destroy or kill insects, animal life and fungus growths and the like, and more particularly to include those toxic materials adapted for use in the dried fruit industry. The term "toxic" as used in the specification and the appended claim is intended to apply only to toxicity towards insect pests, germs, fungi and the like, and does not indicate any toxicity towards higher animals, especially man.

I have found by experiment that particularly effective results have been obtained by the use of a mixture essentially composed of 25% by volume of ethylene oxide and 75% by volume of ethylene dichloride. The addition of ethylene dichloride to ethylene oxide produces a mixture which is effective in its kill at low concentrations, and economical for use in all seasons, as well as for the other reasons enumerated above. The product thus formed can be transported, handled and measured in the liquid state, and can be conveniently held within the fumigating area without unwarranted loss until the fumigation has been completed. Some mixtures of ethylene dichloride with compounds such as methyl formate, ethyl formate, and propylene oxide, were tested. The results of these tests proved that while such compositions are useful, the mixtures of ethylene dichloride with ethylene oxide produced better results, and were generally preferable. So that a true comparison would result, all mixtures tested contained the same proportional amount of ethylene dichloride on a volume percent basis. The results of my experiments showed that this novel mixture was superior to other well-known fumigants. For instance, it is 20% to 25% more effective than ethyl formate; 30% to 40% more effective than methyl formate; and 55% to 65% more effective than either ethylene dichloride or ethyl acetate alone. The above percentages are to be understood to mean that the amount by volume of my new fumigant required to give the same toxic effect as the old fumigant is less than that of the old fumigant by the percentage specified. I have also found that 1 volume of ethylene oxide, or 3 volumes of ethylene dichloride will not individually exhibit the fumigating effectiveness of these respective quantities of such materials in the form of my new mixture, and that about 2 volumes of ethylene oxide, or about 9 volumes of ethylene dichloride, are necessary when used individually to produce a fumigating effectiveness equivalent to the mixtures of this invention. Tests on the basis of pounds per thousand cubic feet necessary for 100% kill with respect to fumigation in fumigating vaults, refrigerator cars, or under canvas, all disclosed substantially the same superiority of my novel composition as compared to the use of either of the components of the mixture. In addition to the unexpectedly improved overall efficiency flowing from the admixture of these two compounds, this invention makes possible a marked lowering of the minimum temperature at which fumigation is effective. Ordinarily ethylene dichloride, for example, performs inconsistently at temperatures between 65° and 70° F., and is generally ineffective below 65° F. The introduction of only one volume of ethylene oxide into three volumes of ethylene dichloride permits effective fumigation at temperatures as low as about 50° F. Although it has heretofore been impossible to use ethylene dichloride alone during the winter, the ethylene dichloride and ethylene oxide mixture may be used in all seasons with substantially the same efficiency of fumigation.

The compositions disclosed herein have been successfully applied to the fumigation of various commodities under canvas, to the fumigation of rooms or chambers, in the fumigation of carpets and clothes in order to rid them of moths and related pests, and in fact to fumigating or insecticidal procedures in general where gaseous toxicants or asphyxiants are indicated for use.

Depending on the nature of the composition desired, the proportions of the components of these mixtures may be varied with respect to each other to obtain fumigants or insecticides which are demanded by the use at hand.

The specific examples listed above are not to be interpreted as constituting a limitation on the scope of my invention.

I claim:

A volatilizing liquid fumigant particularly adapted for treating fruit by being effective to an unusual degree of temperatures below about 70° F., and effective as low as about 50° F., which fumigant is essentially composed of about 1 part by volume of ethylene oxide and about 3 parts by volume of ethylene dichloride, said fumigant being characterized by a toxic effect equivalent to about twice the amount of said ethylene oxide employed separately and equivalent to about three times the amount of said ethylene dichloride employed separately.

JOHN D. MAXCY.